(12) United States Patent
Leseberg

(10) Patent No.: US 7,240,702 B2
(45) Date of Patent: Jul. 10, 2007

(54) ATV MOUNTED TREE SHEAR

(76) Inventor: Terry Leseberg, 1014 N. Sixth St., Beatrice, NE (US) 68310

( * ) Notice: Subject to any disclaimer, the term of this patent is extended or adjusted under 35 U.S.C. 154(b) by 186 days.

(21) Appl. No.: 10/720,959

(22) Filed: Nov. 24, 2003

(65) Prior Publication Data

US 2005/0109424 A1    May 26, 2005

(51) Int. Cl.
  *A01G 23/08* (2006.01)
  *A01G 23/087* (2006.01)
(52) U.S. Cl. .................. 144/4.1; 144/34.1; 144/34.5
(58) Field of Classification Search ............ 144/4.1,
  144/34.1, 34.5, 24.12, 336; 56/10.1, 10.6,
  56/10.7, 14.7, 14.9, 15.6, 15.9, DIG. 9; 37/302;
  30/228, 231, 134
  See application file for complete search history.

(56) References Cited

U.S. PATENT DOCUMENTS

| | | | |
|---|---|---|---|
| 1,727,067 A * | 9/1929 | Keefe ........................... 56/241 |
| 3,327,745 A * | 6/1967 | Meece et al. .............. 144/34.1 |
| 3,384,962 A * | 5/1968 | Duffy et al. ................... 30/248 |
| 3,572,411 A * | 3/1971 | Coughran, Jr. ............... 144/4.1 |
| 3,795,264 A * | 3/1974 | Coughran, Jr. ............... 144/4.1 |
| 3,881,615 A * | 5/1975 | Albright ...................... 414/732 |
| 3,913,641 A * | 10/1975 | White ........................ 144/34.5 |
| 4,044,804 A | 8/1977 | Dodd |
| 4,081,007 A * | 3/1978 | Loigerot ..................... 144/4.1 |
| 4,210,183 A * | 7/1980 | Nilsen ....................... 144/34.1 |
| 4,301,845 A | 11/1981 | Paul et al. |
| 4,683,924 A * | 8/1987 | Cornelius ................... 144/4.1 |
| 4,946,488 A * | 8/1990 | Davison ..................... 56/14.9 |
| 5,044,409 A | 9/1991 | Hamilton |
| 5,174,098 A * | 12/1992 | Emery ........................ 56/10.7 |
| 5,419,380 A * | 5/1995 | Bot ............................ 144/334 |
| 5,503,201 A * | 4/1996 | Strickland et al. ......... 144/34.5 |
| 5,738,155 A | 4/1998 | Cochran |
| 5,826,341 A | 10/1998 | Massa |
| 6,994,284 B1 * | 2/2006 | Ramun ....................... 241/266 |

* cited by examiner

*Primary Examiner*—Shelley M. Self
(74) *Attorney, Agent, or Firm*—Kinney & Lange, P.A.

(57) ABSTRACT

The present invention is a vegetation cutting apparatus for connection to an all terrain vehicle. A frame attaches to the front grill of the all terrain vehicle. Specifically, a first frame member attaches to the front grill while a second frame member, which extends forward relative to the all terrain vehicle, attaches to the first frame member. A shear attaches to the forward end of the second frame member. A hydraulic system actuates the shear to perform the cutting of vegetation.

8 Claims, 6 Drawing Sheets

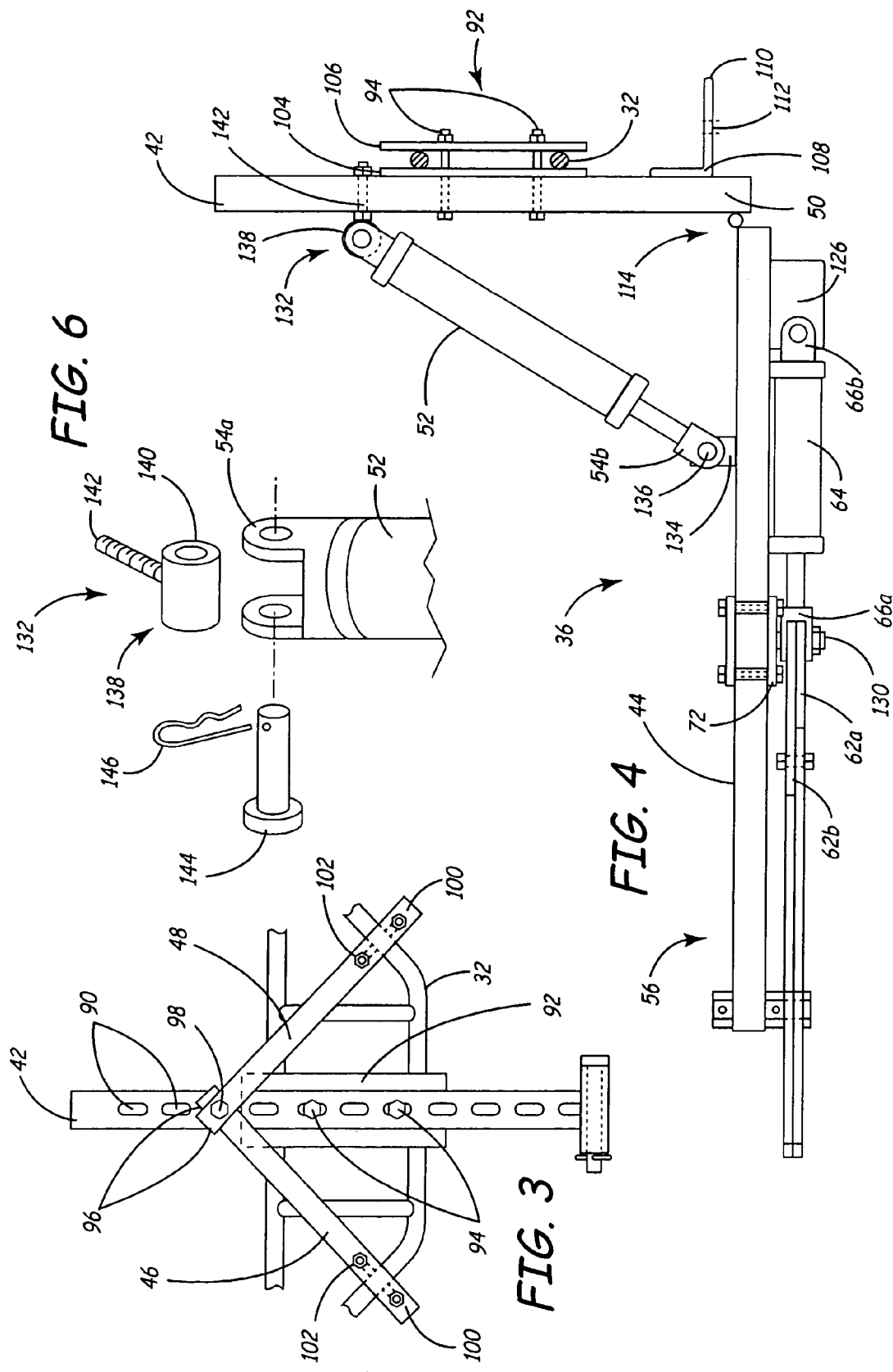

ATV MOUNTED TREE SHEAR

BACKGROUND OF THE INVENTION

The present invention relates generally to a tree shear mounted to an all-terrain vehicle. More specifically, the present invention relates to a shear mounted to the vehicle and powered by an auxiliary power source for easy transport and operation at any practical location desired.

Many tree shear devices have been designed for either pruning branches from trees or cutting down a tree itself at the base of the trunk. Generally, tree shears have been composed of cutting devices positioned at the end of a rod or pole in order to reach the trunk or branches of a tree through its leaf cover. Known are various tree trimming devices and shears that are either manually operable or power driven. Power driven tree shears obtain their power from sources such as hydraulic pumps, internal combustion engines, or electric motors.

All-terrain vehicles, or ATVs, are also commonly known. ATVs are relatively small four wheeled vehicles with small engines, and are characterized as being utilized for both recreational and utility purposes. ATVs are known for their maneuverability and mobility in all types of terrains. The vehicles are designed to carry one or two persons for both on-road and off-road use. Because of their small size, ATVs can be driven along small trails and over rough topography. Due to this extreme versatility, numerous accessories and implements for use with ATVs are known, including trailers, aftermarket racking systems, and snow plow blades, all of which enhance the utility of the ATV.

BRIEF SUMMARY OF THE INVENTION

The present invention is a vegetation cutting apparatus for connection to an all terrain vehicle (ATV). A first frame member connects the apparatus to the front grill of the ATV. A second frame member pivotally attaches to the first frame member at the rear of the second frame member. A cutting device such as a shear attaches to the front of the second frame member. The pivotal connection between the first frame member and second frame member allows adjustments in the height of the cutting device.

The cutting device is hydraulically actuated by an auxiliary hydraulic system mounted to the ATV. The controls of the hydraulic system are placed so that the ATV rider can operate the invention while in the usual riding position. The auxiliary hydraulic system comprises a power source connected to a hydraulic pump that actuates a hydraulic cylinder which is connected to the blades of the cutting device.

BRIEF DESCRIPTION OF THE DRAWINGS

FIG. 3 is a front view of one embodiment of a portion of a frame of the present invention mounted to a front grill of the ATV.

FIG. 4 is a side view of the frame mounted to the front grill with a shear and a hydraulic cylinder attached to the frame.

FIG. 6 is an exploded view of a disclosed embodiment of the connection between a first frame member and a second frame member of the frame of FIG. 4.

DETAILED DESCRIPTION

Figure 1:
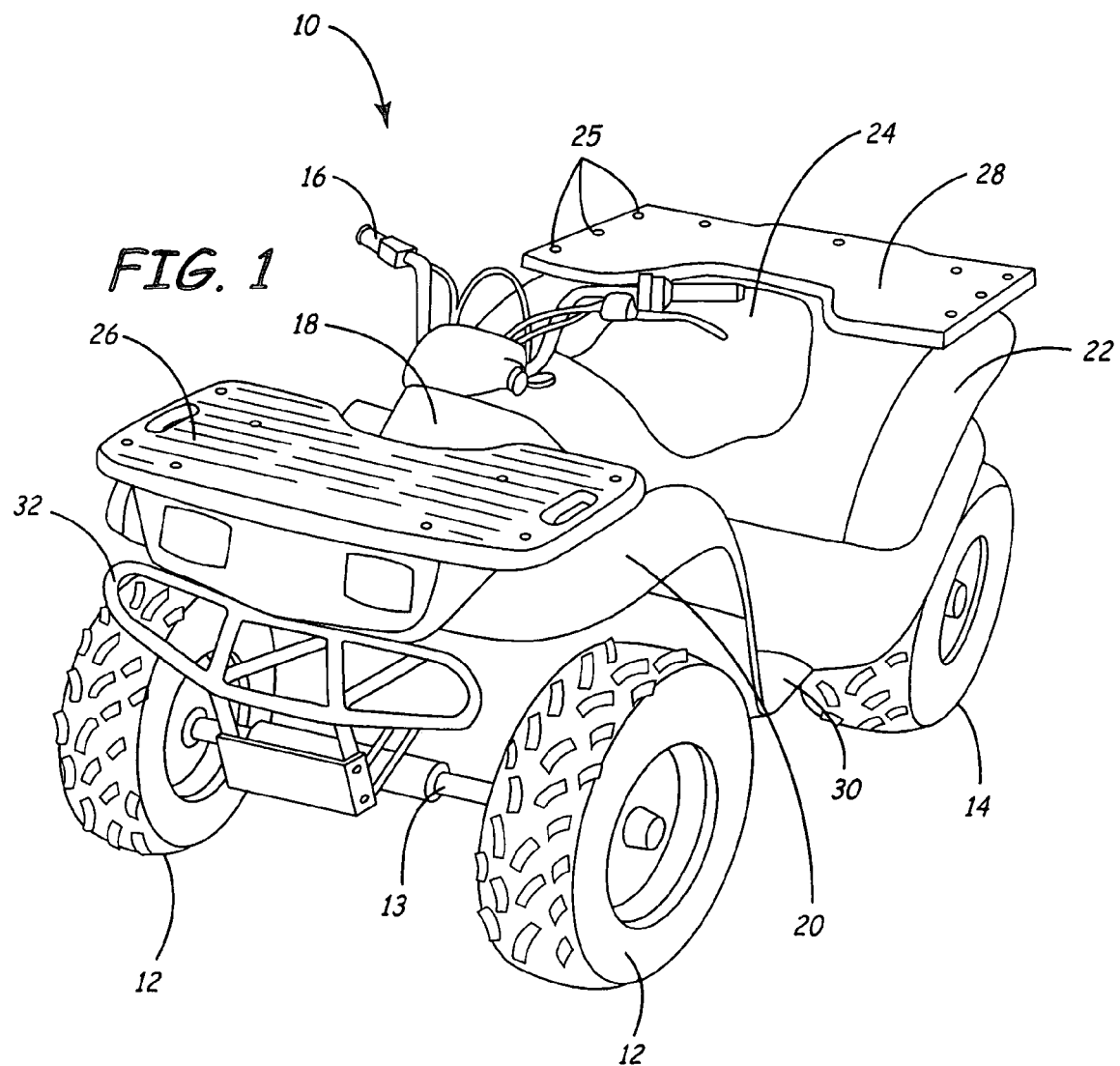
FIG. 1 is a perspective view of a typical ATV.

FIG. 1 is a perspective view of a typical ATV 10. A typical ATV 10 has four wheels, including two front wheels 12 and two rear wheels 14, with the front wheels 12 capable of being steered with a handlebar 16 by the ATV operator. The front wheels 12 and rear wheels 14 are each attached to a respective front axle 13 and rear axle (not shown). The wheels and axles are part of a drive train system. Each axle is mounted on a suspension system relative to the vehicle frame. The frame supports an engine which actuates the drive train system. A main body portion 18 covers the frame which holds the engine and drive train system. Common elements of the main body portion 18 include a front fender 20 and a rear fender 22, and a seat 24 for the ATV operator.

Other elements of an ATV 10 include various support structures, such as a front rack 26, a rear rack 28, a foot rest 30 on each side of the seat 24, and a front grill 32. Other optional support structures not show include a front hood, a rear cargo box, and a roll cage. The front rack 26 and rear rack 28 are positioned atop the front fender 20 and rear fender 22, respectively, and are mounted to the frame of the ATV 10 by a plurality bolts that extend through holes 25. The front grill 32 may further act as a brush guard to protect the engine. The front grill 32 is constructed of metal tubing and is attached to the frame of the ATV 10. Similarly, each foot rest 30 is also attached to the frame of the ATV 10.

Figure 2:
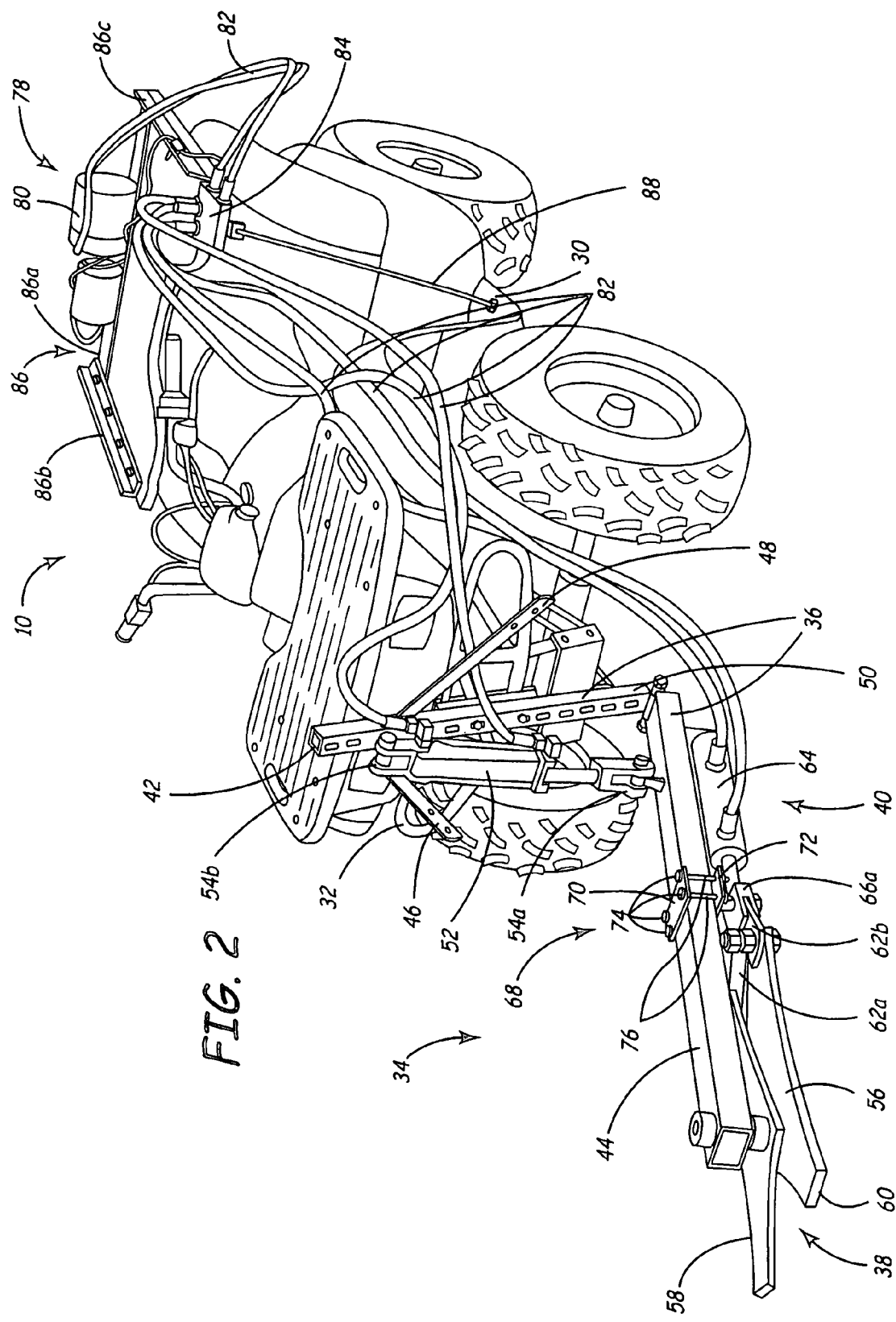
FIG. 2 is a perspective view of a typical ATV with a vegetation cutting device of the present invention mounted thereto.

FIG. 2 is a perspective view of an ATV 10 with a vegetation cutting apparatus 34 of the present invention mounted thereto. The vegetation cutting apparatus 34 is composed of a frame 36, a means 38 for cutting vegetation attached to the frame 36, and a means 40 for actuating the means 38 for cutting vegetation. The frame 36 has a first frame member 42, and a second frame member 44. The frame 36 is fastened to the front grill 32 and frame of the ATV 10.

In a first embodiment, the first frame member 42 is a stanchion constructed from a rectangular metal tube having a plurality of slots aligned on opposing sides. The first frame member 42 is mounted centrally to front grill 32 of ATV 10. Braces 46 and 48 further attach and secure the first frame member 42 to the front grill 32. First frame member 42 may also be constructed from a U-shaped unistrut that contains slots on the center of the unistrut, or may be constructed from a circular tube containing slots that extend through the diameter of the tube.

Second frame member 44 attaches to a lower end 50 of first frame member 42 and extends forward relative to the front of ATV 10. In a first embodiment, second frame member 44 is pivotally connected to first frame member 42. The second frame member 44 comprises a length of tubing, preferably 2"×3"×¼" metal tubing. The second frame member 44 has a length that allows the means 38 for cutting to reach the trunk or stalk of a plant without the ATV 10 contacting the vegetation. This allows the ATV operator to see and position the means 38 for cutting while remaining seated on ATV 10. Because the second frame member 44 attaches to the centrally located first frame member 42 and extends forward from the ATV 10, an operator can freely steer the ATV 10 without the second frame member 44 interfering with the turning radius of the front wheels 12.

In one embodiment, a support member 52 may be attached between first frame member 42 and second frame member 44. In a preferred embodiment, support member 52 is a hydraulic cylinder, such as a dual acting hydraulic cylinder with a rod end clevis 54*a* and a barrel end clevis 54*b*, which allows for adjustment of the height of the second frame member 44 with respect to the first frame member 42.

A means 38 for cutting is attached to the second frame member 44. The function of cutting is accomplished by a shear, a reciprocating blade, a circular blade, a chain blade, or a sickle blade among others. As illustrated in FIG. 2, in one embodiment, the means 38 for cutting comprises a shear 56 having a first blade arm 58, a second blade arm 60, and two linking members 62*a* and 62*b*.

The shear 56 is connected to the means 40 for actuating. The function of actuating is accomplished by gears, cams, pistons, pulleys, levers, or other similar devices that translate motion from a power source. In one preferred embodiment, means 40 for actuating comprises a hydraulic cylinder 64. The hydraulic cylinder 64 is a dual acting hydraulic cylinder with a rod end clevis 66*a* and a barrel end clevis 66*b* (not shown). Suitable hydraulic cylinders are know within the art. The rod end clevis 66*a* of the hydraulic cylinder 64 attaches to shear 56 and to a guide 68 that is slidably mounted to the second frame member 44.

The guide 68 includes a pair of matched guide plates 70 and 72 positioned on opposite top and bottom sides of second frame member 44. The guide plates 70 and 72 are made of metal or a similar rigid and durable material. Guide plates 70 and 72 are slidably connected to second frame member 44 by fasteners 74, with spacers 76 positioned between plates 70 and 72. Spacers 76 have a length sufficient to permit guide 68 to slide along second frame member 44 when the rod of hydraulic cylinder 64 is extended. In an alternate embodiment, the guide 68 is constructed of a rectangular tube that has an inner dimension allowing for a clearance fit over second frame member 44.

As illustrated in FIG. 2, the holes in guide plates 70 and 72 are spaced to allow a clearance fit between spacers 76 about each side of second frame member 44 when fasteners 74 are inserted through guide plates 70 and 72 and spacers 76. Guide 68 assures that hydraulic cylinder 64 moves in a linear path parallel to second frame member 44 to prevent the shear 56 from binding or angling during the cutting process.

Also illustrated in FIG. 2 is a hydraulic system 78. Hydraulic system 78 comprises a hydraulic pump 80, hydraulic lines 82, and a control valve 84 mounted on a frame 86 connected to rear rack 28. The frame 86 is comprised of frame members 86*a*, 86*b*, and 86*c*. Hydraulic lines 82 extend from the hydraulic cylinder 64 and support member 52 to control valve 84, and from control valve 84 to the hydraulic pump 80. The control valve 84 is located proximate to the seat of the ATV 10 and is mounted to long side member 86*c* of frame 86, which is secured to the rear rack 28 of ATV 10.

The control valve 84 is further supported by a rod support 88, which attaches between frame member 86*c* supporting control valve 84 and foot rest 30. Rod support 88 is a metal rod or an equivalent. Rod 88 is inserted into a preexisting aperture in the foot rest 30 of the ATV 10 and secured on the bottom side of foot rest 30 (not shown).

FIG. 3 illustrates a front view showing first frame member 42 and braces 46 and 48 mounted to front grill 32. The first frame member 42 includes a plurality of slots 90. The slots 90 in first frame member 42 allow for the reception of fasteners at various points along the first frame member 42, allowing for vertical adjustability in mounting frame 36 to front grill 32. A clamping mechanism 92 is attached about front grill 32 and is secured by fasteners 94 that extend through the slots 90.

First linking brace 46 and second linking brace 48 secure first frame member 42 with respect to grill 32. Braces 46 and 48 are preferably fabricated from ⅛"×1½" metal bar stock. Alternatively, braces 46 and 48 can be fabricated from a sheet of metal or other similarly rigid material. Braces 46 and 48 are each provided with a hole at one end 96 for alignment with and connection to one slot 90 of first frame member 42 by bolt 98. Braces 46 and 48 also include a plurality of spaced holes at the opposite ends 100, which straddle a tube portion of front grill 32. Each end 100 of braces 46 and 48 is secured to front grill 32 by a U-bolt 102 or similar fastener.

FIG. 4 illustrates a side view of frame 36. As shown in FIG. 4, clamping mechanism 92 is comprised of a pair of plates 104 and 106. Plates 104 and 106 are made of metal, which in one embodiment is a section of ½"×2½" bar stock. The plates 104 and 106 may also be fabricated from a larger sheet of metal or an equivalent. Plates 104 and 106 are provided with a plurality of spaced holes, preferably towards opposite ends of the plate. Plate 104 is positioned between the first frame member 42 and the front grill 32, while plate 106 is placed behind front grill 32.

Fasteners 94, such as bolts, extend through the first frame member 42, and through plates 104 and 106. The fasteners 94 are positioned so plates 104 and 106 exert a clamping force around the front grill 32, while at the same time the fasteners stabilize and secure first frame member 42 to ATV 10.

To secure a lower end 50 of the front frame member 42 to the ATV 10, a bracket 108 is utilized. Bracket 108 is of metal construction and is generally L-shaped. Bracket 108 is attached to the first frame member 42, such as by welding, or bolting to the first frame member 42 through one slot 90 of the preferred construction of first frame member 42. Bracket 108 attaches with one portion 110 set normal to the first frame member 42. The portion 110 of bracket 108 contains a hole 112 for reception of a fastener which can be secured to the frame of ATV 10. In an alternate embodiment, Bracket 108 is a length of threaded rod that is affixed to the lower end 50 of the front frame member 42 and to the frame of ATV 10.

The attachment of the first frame member 42 to the ATV 10 remains semi-permanent. The braces 46 and 48, bracket 108, and clamping mechanism 92 secure the first frame member, but can be readily disconnected form ATV 10 when removal of vegetation cutting apparatus 34 is desired. The central location of the first frame member 42 is out of the ATV operator's line of sight and does not interfere with the operation of the ATV. Additionally, the slots 90 allow for connection of other accessories to the ATV via the first frame member 42.

Figure 5:
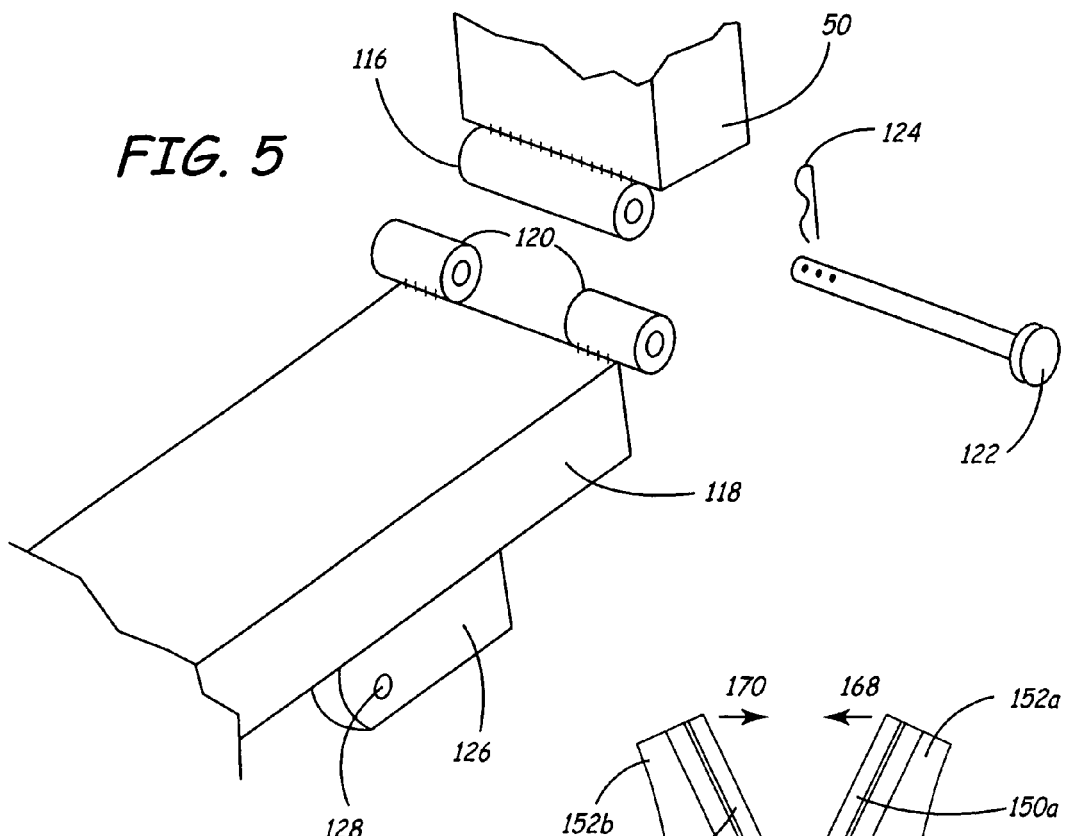
FIG. 5 is an exploded view of a disclosed embodiment of the connection between a support member and a first frame member.

As further shown in FIG. 4, second frame member 44 is secured to first frame member 42 by a pivotal connection 114. FIG. 5 illustrates an exploded view of the pivotal connection 114 between the first frame member 42 and second frame member 44. In one embodiment, a first frame pivot tube 116 is secured to end 50 of the first frame member 42 by welding. The first frame pivot tube 116 is a hollow metal cylinder such as a section of pipe. Proximal end 118 of second frame member 44 is configured with a pair of second frame pivot tubes 120, which are spaced to receive first frame pivot tube 116 therebetween. The second frame pivot tubes 120 are hollow metal cylinders, preferably of the same nominal diameter as the first frame pivot tube 116. First frame member 42 and second frame member 44 are connected by positioning first frame pivot tube 116 between the second frame pivot tubes 120 and inserting a fastener 122 through the coaxially aligned lumens of the respective cylinders of second frame pivot tubes 120. In a preferred embodiment, fastener 122 is a clevis pin, which is inserted through the first frame pivot tube 116 and second frame pivot tubes 120 and secured on the opposite end of the head of the clevis pin with a hitch pin 124. The pivotal connection 114 enables a quick disconnect of second frame member 44 from the first frame member 42.

As shown in FIGS. 4 and 5, a metal mounting plate 126 containing a hole 128 is attached to second frame member 44. Mounting plate 126 affixes to second frame member 44 by welding mounting plate 126 perpendicular to second frame member 44. Referring to FIG. 4, hydraulic cylinder 64 is connected to second frame member 44 by aligning the barrel end clevis 66b of hydraulic cylinder 64 around mounting plate 126, and inserting a fastener through the concentrically aligned holes of the barrel end clevis 66b and mounting plate 126.

The rod end clevis 66a of hydraulic cylinder 64 is attached to linking members 62a and 62b of the shear 56. Guide 68 is also affixed to the rod end clevis 66a of the hydraulic cylinder 64. Guide plate 72 contains a centrally located hole. A fastener 130 is inserted through the hole and connects to the rod end clevis 66a of the hydraulic cylinder 64 to the guide 68 and linking members 62a and 62b.

FIG. 4 also illustrates a support member 52 between the first frame member 42 and second frame member 44. Support member 52 attaches to first frame member 42 at pivotal connection 132. The support member 52 is also attached to the second frame member 44. As illustrated in FIG. 4, the second frame member 44 contains a bracket 134. Bracket 134 is a metal plate with a circular hole through the central portion of the plate. Bracket 134 perpendicularly affixes to the second frame member 44, preferably by welding, such that the rod end clevis 54b of the support member 52 attaches to the second frame member 44 by the insertion of a cylindrical fastener 136. The cylindrical fastener 136 is preferably a clevis pin held in place by a hitch pin.

FIG. 6 is an exploded illustration of pivotal connection 132 between support member 52 and first frame member 42. A bracket 138 is used to secure support member 52 to the first frame member 42. Bracket 138 is a piece of round tubing 140 with a bolt 142 affixed providing an axis through the center of the tube which is perpendicular to an axis through the center of the threads of the bolt 142. As shown in FIGS. 4 and 6, the bolt 142 of bracket 138 is inserted through slots 90 of first frame member 42 and secured with a standard nut. The piece of round tubing 140 is of a length that allows a clearance fit when inserted between the ends of the barrel end clevis 54a of the support member 52. By aligning the center of the piece of round tubing 140 with the center of the holes in the barrel end clevis 54a of the support member 52, a fastener 144, such as a clevis pin or similar fastener, can be inserted for attachment to first frame member 42. The fastener 144 is secured with a hitch pin 146.

The use of a hydraulic cylinder as support member 52 allows second frame member 44 to pivot relative to first frame member 42 thus allowing second frame member 44 to be raised or lowered to adjust the height at which vegetation is cut or while ATV 10 is in transport. In the preferred embodiment, the support member 52 is a dual acting cylinder. Alternatively, support member 52 may be a metal member having an adjustable length for varying the position of second frame member 44.

Figure 7:
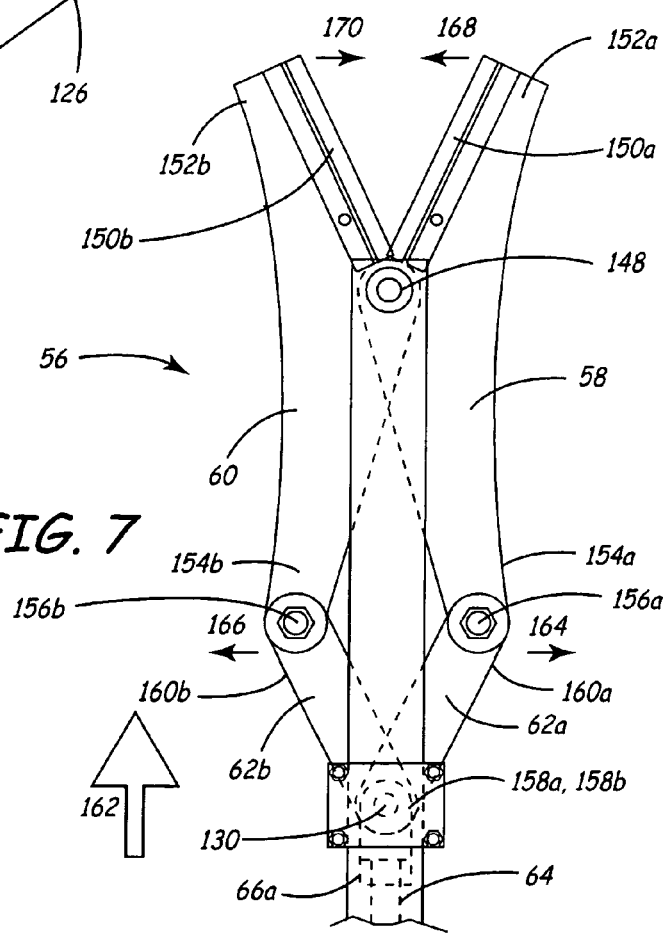
FIG. 7 is a top view of a shear mounted to the end of the frame.
Figure 8:
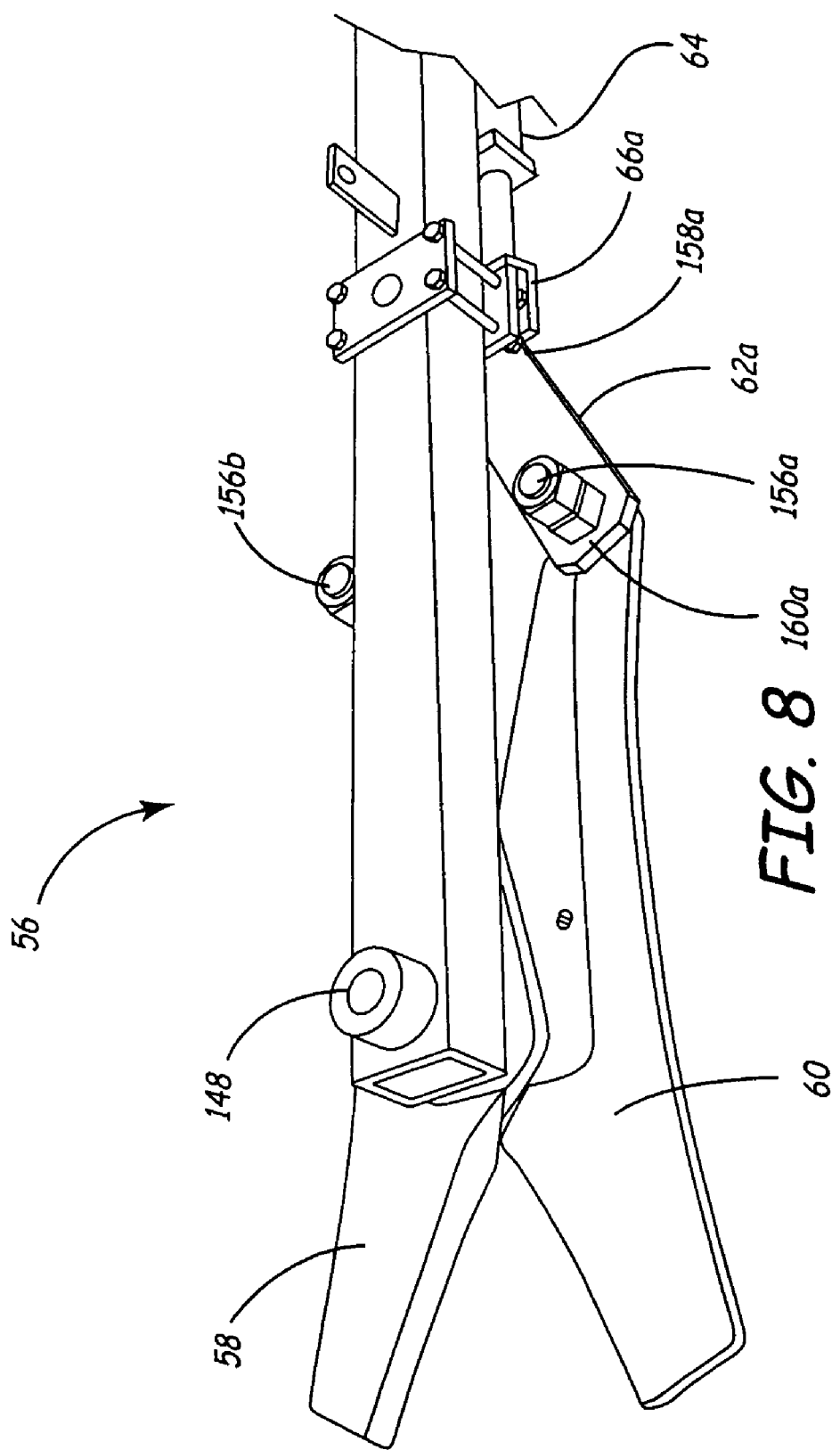
FIG. 8 is a perspective view of a shear mounted to the end of the frame.

FIGS. 7 and 8 show a top view and a perspective view, respectively, of one embodiment of shear 56. The shear 56 is comprised of linking members 62a and 62b, a first blade arm 58, and a second blade arm 60, which together create a scissors-like cutting device. The first blade arm 58 is pivotally connected to second blade arm 60 by fastener 148, which is attached to the second frame member 44. Fastener 148 may be a bolt or circular pin. The first blade arm 58 contains a blade 150a at the distal end 152a. The second blade arm 60 contains a blade 150b at the distal end 152b. The proximal end 154a of the first blade arm 58 contains a hole for reception of a fastener 156a to join the first blade arm 58 to linking member 62a. Similarly, the proximal end 154b of the second blade arm 60 contains a hole for reception of a fastener 156b to attach to linking member 62b. Fasteners 156a and 156b are standard bolts or similar structures.

As illustrated in FIG. 8, the first blade arm 58 is mounted between the second frame member 44 and the second blade arm 60. A spacer such as a washer is inserted between the second blade arm 60 and the second frame member 44 to assure linear actuation parallel to the bottom surface of the second frame member 44.

The blade 150a of the first blade arm 58 comprises a cutting surface. The blade 150a can be fabricated on the first blade arm 58 structure, as shown in FIG. 8, or may be a removable insert as illustrated in FIG. 7. In the preferred embodiment, the blade 150a is part of the structure of the first blade arm 58 as a chamfered surface on the inner edge of the first blade arm 58. The bevel of the chamfer starts on the top surface and comes to a point on the bottom surface of first blade arm 58, preferably at an angle of 20-35 degrees. It is preferable that the blade 150b of the second blade arm 60 contain a chamfer on the bottom side rather than the top side of the inner edge of the second blade arm 60. This arrangement of cutting surfaces allows for the bypass of the blades 150a and 150b when actuating the shear 56 without binding due to material being pinched between the blades. The first and second blade arms 58 and 60 are constructed from pre-hardened alloy, with the blades 150a and 150b heat treated for additional strength. Although the blades 150a and 150b are shown as straight edges, it is known in the art that shears may also contain convex, concave, or other shaped blades.

Referring to FIG. 7, the first and second blade arms 58 and 60 connect to the hydraulic cylinder 64 by linking members 62a and 62b. The linking members 62a and 62b are flat metal bars fabricated from bar stock or a larger sheet of metal. The linking members 62a and 62b are oval or rectangular in shape, and contain holes on each opposing end of the length. The proximal ends 158a and 158b of each respective linking member 62a and 62b are pivotally connected to the hydraulic cylinder 64 as previously described. The distal ends 160a and 160b of linking members 62a and 62b connect to the proximal ends 154a and 154b of the first and second blade arms 58 and 60. The linking members 62a and 62b and the first and second blade arms 58 and 60 are pivotally attached by use of fasteners 156a and 156b.

Referring to FIG. 7, when the rod of hydraulic cylinder 64 is extended in the direction of arrow 162, force is exerted on linking members 62a and 62b causing each respective linking member 62a and 62b to pivot outward from the second frame member 44 about an axis centered on the fastener 130. As a result of this movement, the distal ends 160a and 160b apply a force to proximal ends 154a and 154b causing movement outward from the second frame member 44 in the directions of arrows 164 and 166, respectively. The blades 150a and 150b pivot toward one another about the pivotal connection of fastener 148 in the directions of arrows 168 and 170, respectively. When the hydraulic cylinder 64 is extended far enough, the blades 150a and 150b will first meet, and then bypass each other, thus causing a shearing of vegetation located between the blades 150a and 150b.

The dual actuating capability of hydraulic cylinder 64 permits translation of motion to both open and close the shear 56. Thus, if an object does not cut or starts to bind between the blades 150a and 150b, the operator can reverse the direction of the shear 56 to open the blades 150a and 150b. Upon opening the blades 150a and 150b, the operator may then attempt the cutting process again.

Figure 9:
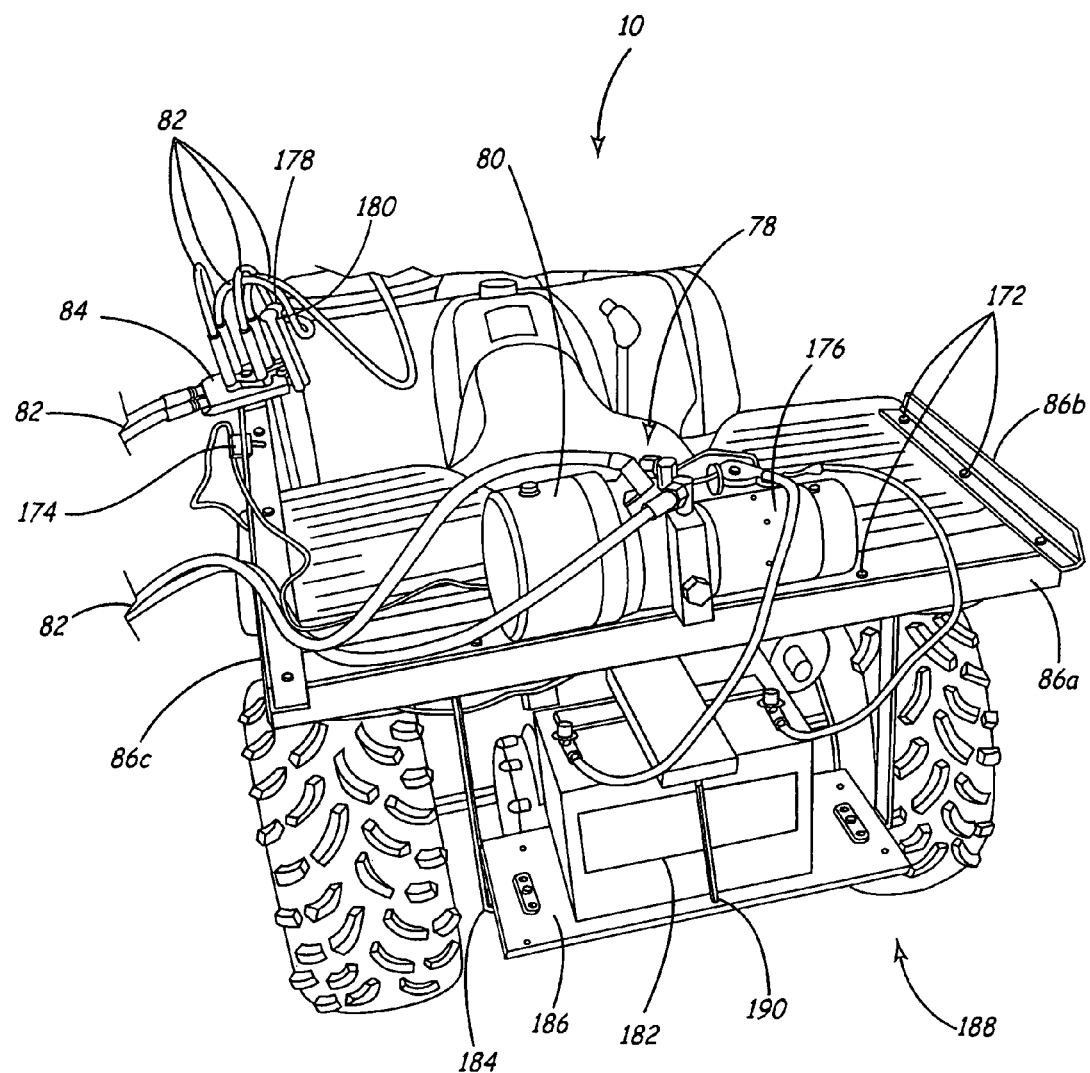
FIG. 9 is a perspective view of the rear of a typical ATV with of a hydraulic system of the present invention mounted thereto.

FIG. 9 is a rear perspective view of ATV 10 with hydraulic system 78 mounted thereto. The hydraulic system 78 is auxiliary to the power system that drives the ATV. To carry hydraulic system 78, frame members 86a, 86b, and 86c of frame 86 are secured to rear rack 28. Preferably, each frame member is formed from angle iron with frame members 86a and 86b having a length corresponding to the length and width, respectively, of rear rack 28. Alternatively, each frame member is constructed from a section of unistrut. Frame member 86c has a length sufficient to support control valve 84 proximate to the seat of ATV 10. Frame members 86a-86c are secured to rear rack 28 with fasteners 172. In one embodiment, frame members 86b and 86c are secured to frame member 86a.

The control valve 84 is attached to the end of frame member 86c. The control valve 84 is a dual spool in-line directional valve, or similar valve known in the industry. Dual spool in-line directional valves allow for the control of two double-acting hydraulic cylinders. With a dual spool valve, two controls handles 178 and 180 are present allowing for handle 178 to control the hydraulic cylinder 64 to close and open the shear 56, while handle 180 controls the support member 52, which allows raising and lower of the second frame member 44.

Electric switch 174 is likewise mounted to the long side support 86c adjacent to the control valve 84. The frame member 86c extends past the back rack 28 towards the front of the ATV, being located relative to the seat of the ATV. This allows the seated ATV operator to not only control the movement of the ATV, but also have access to handles 178 and 180 and electric switch 174 which control the operation of the shear 56.

The hydraulic pump 80 and electric motor 176 are mounted to frame member 86a of the frame 86. Mounting can be achieved by welding the hydraulic pump 80 and electric motor 76 to the frame 86, or by securing the same with fasteners to the frame 86. If the frame 86 is removed from the ATV, all parts associated with the hydraulic system 78 will be removed with the frame. This allows for quick disconnect of the hydraulic system 78 from the ATV.

In one embodiment, hydraulic pump 80 is connected to an electric motor 176 driven by a battery 182. The electric motor 176 and battery 182 comprise a power source 188 of hydraulic system 78. Electric switch 174 is wired between the battery 182 and the hydraulic pump 80. The operator can control the power to the hydraulic pump 80 via the electric switch 174. The hydraulic pump 80 will only run when the operator determines power is needed. Other power sources that could be utilized include electric various AC or DC motors, or internal combination engines.

In the preferred embodiment, the battery 182 to run the electric motor 176 is mounted to the ATV in a convenient location that does not interfere with the operator of the ATV. As illustrated in FIG. 9, this can be accomplished by attaching a U-shaped bracket 184 to the frame 86. A support shelf 186 is then secured to the U-shaped bracket 184. The battery rests on the support shelf 186 and may be further secured with a battery clamp 190 or tarp strap commonly used in the art. Alternatively, the power source 188 and hydraulic pump 80 may be mounted to a trailer towed by the ATV, or may be secured to the back rack of ATV. The battery 182 is auxiliary to the battery of the ATV. This prevents drain on the battery of the ATV from operation of the vegetation cutting apparatus 34. Also, standard ATV electrical systems are not powerful enough to supply the necessary power to run the hydraulic pump 80.

The shear 56 and hydraulic systems 78 are easily disassembled from the ATV by removing the fasteners 122 and 144, the fastener securing rod support 88 to foot rest 30, and the fasteners 172 that hold on frame 86. This allows for the support member 52 and second frame member 44 holding the shear 56 to be removed from the first frame member, and the hydraulic system 78 attached to the frame 86 to be removed from the ATV 10. The ATV 10 can then be used for other recreational or utility purposes. Then, upon need for the vegetation cutting apparatus 34 of the present invention, the apparatus can be easily and quickly reconnected to the ATV.

Although the present invention has been described with reference to preferred embodiments, workers skilled in the art will recognize that changes may be made in form and detail without departing from the spirit and scope of the invention.

The invention claimed is:

1. A vegetation cutting apparatus for connection to an all-terrain vehicle, the apparatus comprising:
   a frame for mounting to the all-terrain vehicle, the frame comprising:
      a first frame member comprising a single stanchion for connecting to the all-terrain vehicle;
      a second frame member attached to the first frame member, the second frame member extending forward relative to the all-terrain vehicle;
   a shear comprising:
      a first shear blade member having a proximal end and distal end, with a blade located adjacent the distal end; and
      a second shear blade member having a proximal end and a distal end, with a blade located adjacent the distal end, the second shear blade member being movable relative to the first shear blade member to cut an object placed between the respective blades of the first and second shear blade members;
   wherein the first blade member and the second blade member are pivotally connected to the second frame member about a common pivot point; and
   wherein the first blade member is connected to a means for actuating by a first linking member, the first linking member being pivotally fastened to the proximate end of the first blade member and pivotally connected to the means for actuating; and wherein the second blade member is connected to the means for actuating by a second linking member, the second linking member being pivotally fastened to the proximate end of the second blade member and pivotally connected to the means for actuating.

2. The apparatus of claim 1, wherein the means for actuating comprises:
a first hydraulic cylinder having a first end attached to the first linking member and the second linking member, and a second end attached to the second frame member; and,
a hydraulic system connected to the first hydraulic cylinder.

3. The apparatus of claim 2 wherein the hydraulic system comprises:
a power source separate than that which powers the all-terrain vehicle;
a hydraulic pump connected to the power source; and,
a control system for controlling the hydraulic system.

4. The apparatus of claim 3, wherein the control system comprises a control valve to actuate the first hydraulic cylinder, wherein the control system is mounted proximal to a seat of the all-terrain vehicle.

5. The apparatus of claim 3, wherein the first frame member and second frame member are connected by a supporting member.

6. The apparatus of claim 3, wherein the supporting member comprises a second hydraulic cylinder having a proximal end and a distal end, wherein the proximal end of the second hydraulic cylinder attaches to the first frame member and the distal end of the second hydraulic cylinder attaches to the second frame member, and wherein the second hydraulic cylinder connects to the hydraulic system.

7. The apparatus of claim 1, wherein the first frame member pivotally connects to the second frame member.

8. The apparatus of claim 1, wherein the first frame member is attached to a front grill of the all-terrain vehicle with a first linking brace and a second linking brace, the first linking brace and second linking brace each having a proximal and distal end, wherein the proximal end of the first linking brace is fastened to the first frame member and the distal end of the first linking brace is fastened to the front grill, and wherein the proximal end of the second linking brace is fastened to the first frame member and the distal end of the second linking brace is fastened to the front grill.

* * * * *